Oct. 16, 1945.  T. MILLER  2,387,035
GASOLINE AND WATER SEPARATOR
Filed June 16, 1944

Inventor
Tyre Miller,
By McMorrow & Berman
Attorneys

Patented Oct. 16, 1945

2,387,035

UNITED STATES PATENT OFFICE 2,387,035

GASOLINE AND WATER SEPARATOR

Tyre Miller, Boynton, Okla.

Application June 16, 1944, Serial No. 540,731

1 Claim. (Cl. 210—57)

The present invention relates to new and useful improvements in gasoline and water separators designed primarily for use in removing water from gasoline as the latter is placed in the fuel tank of an automobile, truck, tractor or the like and the invention has for its primary object to provide a funnel having one or more traps therein and in which the water is collected while the gasoline passes through the funnel.

An important object of the present invention is to provide a sight gauge for the trap by means of which the user can determine the amount of water collected in the separator.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
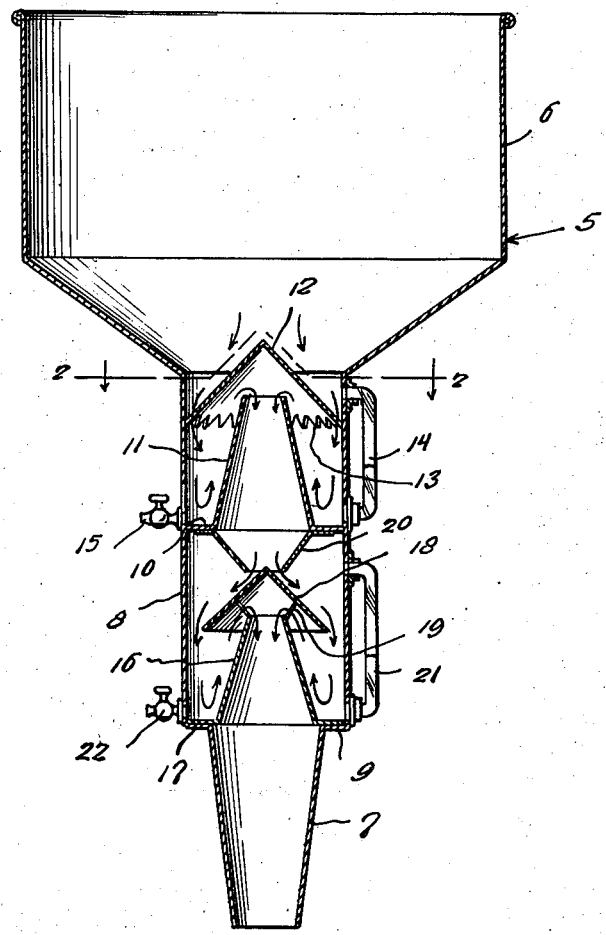
Figure 1 is a vertical sectional view.
Figure 2:
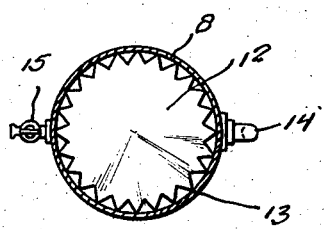
Figure 2 is a transverse sectional view taken substantially on a line 2—2 of Figure 1.

Referring now to the drawing in detail, wherein for the purpose of illustration I have disclosed a preferred embodiment of the invention, the numeral 5 designates a funnel type member which includes an upper hopper portion 6 and a lower discharge mouth 7. Between the hopper 6 and the lower end 7 is a cylindrical intermediate portion 8 having a shoulder 9 at the junction of its lower portion with the lower end 7 of the funnel.

Positioned in the cylindrical intermediate portion 8 is one or more horizontal partitions 10 having an upstanding conical member 11 rising from its central portion, the walls of the member 11 tapering toward its upper end and open at its top and bottom portions to provide free communication therethrough.

A conical baffle 12 is positioned in the cylindrical portion 8 of the funnel above the member 11, the edges of the member 12 being secured to the walls of the member 8 at a point below the upper end of the member 11. The lower edges of the baffle 12 are formed with notches 13.

A glass sight gauge 14 has its ends communicating with the interior of the cylindrical member 8 at a point immediately above the partition 10 and immediately above the lower edge of the baffle 12. A drain valve 15 is also provided for the cylindrical member 8 at a point immediately above the partition 10.

The portion of the cylindrical member 8 below the partition 10 is also provided with an additional separator comprising a conical member 16 having a flange 17 at its lower edge resting on the shoulder 9, the walls of the member 16 tapering toward its upper end and is otherwise constructed similar to the member 11.

A baffle 18 is supported in spaced relation above the upper end of the member 16 by legs 19, the baffle 18 being of conical formation and having its lower edge positioned below the upper edge of the member 16.

To the under side of the partition 10 is secured an inverted conical discharge member 20 having an open lower end positioned immediately above the baffle 18.

A glass sight gauge 21 is also provided in the walls of the member 8 between the partition 10 and the shoulder 9 and the lower portion of the member 8 is also provided with a drain valve 22.

In the operation of the device, as the gasoline passes through the funnel in the direction as indicated by the arrows in Figure 1, any water contained therein being heavier than the gasoline will be collected either in the upper portion of the separator above the partition 10 or in the lower portion of the separator above the flanges 17 while the gasoline flows over the upper edges of the conical separator members 11 and 16 for eventual discharge through the lower end 7 of the funnel.

The amount of water collected in the trap formed by the partition 10 and the flanges 17 will be indicated in the gauges 14 and 21 and may be drained therefrom by the valves 15 and 22.

It is believed the details of construction, manner of use and advantages of the device will be readily understood from the foregoing without further detailed explanation.

Having thus described the invention, what I claim is:

A separator for liquids, comprising a funnel-shaped body formed to provide an upper cylindrical portion having a substantially conical bottom wall open at its center, an intermediate cylindrical portion depending from said bottom wall about its open center, said intermediate portion having a horizontal bottom wall provided with a central opening, and a lower tapered spout portion depending from the bottom wall of said intermediate portion about the opening therein, a horizontal partition wall dividing said intermediate portion into upper and lower collecting chambers and having a central opening, an inverted conical baffle secured within the upper end of said intermediate portion and having notches in its lower edge for the discharge of liquid therethrough into said upper chamber, a tapered tubular portion rising from said partition about the opening therein and having its upper end terminating in a plane above the lower edge of said baffle, a conical member supported from the lower side of said partition and having an opening in line with the bore of said tubular portion, a tapered tubular member rising within said lower chamber from the bottom wall of said intermediate portion about the opening therein, an inverted conical baffle supported on the upper end of said tapered member and having its apex projecting into the opening in said conical member, the upper end of said tubular member terminating in a plane above the edge of the last named baffle, and a valved outlet from each of said chambers for drawing off liquid trapped therein.

TYRE MILLER.